US007051101B1

(12) United States Patent
Dubrovsky et al.

(10) Patent No.: US 7,051,101 B1
(45) Date of Patent: May 23, 2006

(54) METHODS AND APPARATUS FOR CONTROLLING DEVICES WITHIN STORAGE NETWORK

(75) Inventors: Alex Dubrovsky, Westborough, MA (US); Haim Kirshenberg, Brookline, MA (US); Dar S. Efroni, Ashland, MA (US); Steven M. Blumenau, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 914 days.

(21) Appl. No.: 09/661,103

(22) Filed: Sep. 13, 2000

(51) Int. Cl.
F06F 15/173 (2006.01)

(52) U.S. Cl. .................. 709/225; 709/223; 709/219

(58) Field of Classification Search ............. 709/211, 709/253, 223, 220, 224; 710/105; 370/395
See application file for complete search history.

(56) References Cited

U.S. PATENT DOCUMENTS

| 5,442,791 | A | | 8/1995 | Wrabetz et al. ............ 395/650 |
|---|---|---|---|---|
| 5,586,117 | A | | 12/1996 | Edem et al. ................ 370/466 |
| 5,621,892 | A | | 4/1997 | Cook ...................... 395/200.1 |
| 5,787,259 | A | * | 7/1998 | Haroun et al. ............. 709/253 |
| 5,909,550 | A | | 6/1999 | Shankar et al. ......... 395/200.57 |
| 5,966,707 | A | | 10/1999 | Van Huben et al. .......... 707/10 |
| 5,991,803 | A | * | 11/1999 | Glitho et al. ............... 709/220 |
| 5,999,179 | A | | 12/1999 | Kekic et al. ................ 345/349 |
| 6,085,236 | A | | 7/2000 | Lea ........................... 709/220 |
| 6,209,023 | B1 | * | 3/2001 | Dimitroff et al. ........... 709/211 |
| 6,256,678 | B1 | | 7/2001 | Traughber et al. .......... 709/310 |
| 6,260,062 | B1 | | 7/2001 | Davis et al. ................ 709/223 |
| 6,301,252 | B1 | * | 10/2001 | Rangachar ................ 370/395.2 |
| 6,327,594 | B1 | | 12/2001 | Van Huben et al. ......... 707/200 |
| 6,330,598 | B1 | * | 12/2001 | Beckwith et al. ........... 709/223 |
| 6,377,988 | B1 | * | 4/2002 | Spector et al. .............. 709/224 |
| 6,389,129 | B1 | | 5/2002 | Cowan .................. 379/221.03 |
| 6,425,035 | B1 | * | 7/2002 | Hoese et al. ................ 710/105 |
| 6,426,959 | B1 | * | 7/2002 | Jacobson et al. ........... 370/468 |
| 6,640,278 | B1 | * | 10/2003 | Nolan et al. .................. 711/6 |
| 6,643,748 | B1 | * | 11/2003 | Wieland ..................... 711/152 |
| 6,662,221 | B1 | * | 12/2003 | Gonda et al. ............... 709/223 |
| 6,745,207 | B1 | * | 6/2004 | Reuter et al. ............... 707/200 |
| 6,834,299 | B1 | * | 12/2004 | Hamilton et al. ........... 709/220 |
| 2001/0047482 | A1 | | 11/2001 | Harris et al. ................ 713/200 |
| 2002/0036794 | A1 | | 3/2002 | Boehmer et al. .......... 358/1.15 |
| 2002/0133581 | A1 | | 9/2002 | Schwartz et al. ........... 709/223 |

* cited by examiner

*Primary Examiner*—Jason Cardone
*Assistant Examiner*—Thomas Duong
(74) *Attorney, Agent, or Firm*—Chapin IP Law, LLC; Barry W. Chapin, Esq.

(57) ABSTRACT

A management station includes a management application that controls zoning within devices manufactured or provided from different vendors within a network, such as a data storage network. The management application receives a generic zone control command from a user to control zoning within a device in the network. The management application translates the zone control command to one or more vendor specific device zone control commands in a vendor specific device command set that is specifically designed to control zoning within devices from a specific vendor. To perform the translation, the management application identifies the vendor of one or more devices that are affected by the zone control command. Based on this identification, the management application selects an appropriate vendor specific device command set that contains vendor specific zone control commands.

44 Claims, 5 Drawing Sheets

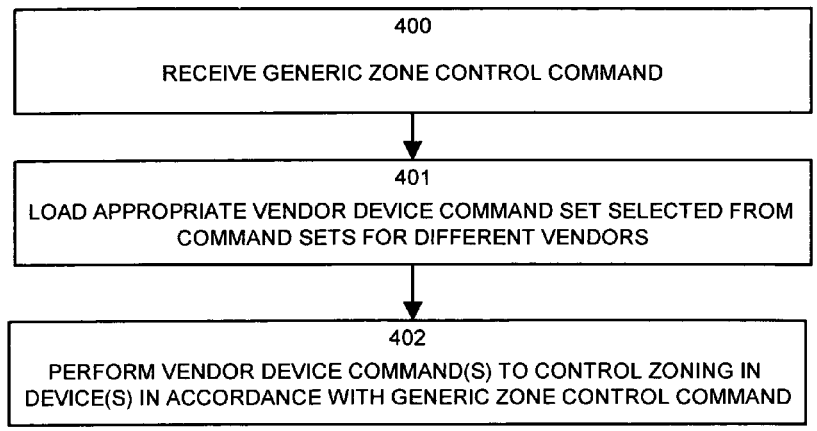

400
RECEIVE GENERIC ZONE CONTROL COMMAND

401
LOAD APPROPRIATE VENDOR DEVICE COMMAND SET SELECTED FROM COMMAND SETS FOR DIFFERENT VENDORS

402
PERFORM VENDOR DEVICE COMMAND(S) TO CONTROL ZONING IN DEVICE(S) IN ACCORDANCE WITH GENERIC ZONE CONTROL COMMAND

FIG. 4

330 

| 360<br>GENERIC ZONE CONTROL COMMANDs | 365-1<br>IBM ZONE CONTROL COMMANDS | 365-2<br>EMC ZONE CONTROL COMMANDs |
|---|---|---|
| CREATE_ZONE(ZONE, SERVERS, DATA_STORAGE_RESOURCE) | CREATE_ZONE(ZONE, SERVER_ID, DATA_STORAGE_ID) | CREATE_ZONE(ZONE, SERVERS, DATA_STORAGE_RESOURCE) |
| ADD_TO_ZONE(ZONE, RESOURCE) | ADD_TO_ZONE(ZONE, PORT) | ADD_TO_ZONE(ZONE, RESOURCE) |
| REMOVE_ZONE(ZONE, RESOURCE) | REMOVE_ZONE(ZONE, PORT) | REMOVE_ZONE(ZONE, RESOURCE) |

FIG. 5

METHODS AND APPARATUS FOR CONTROLLING DEVICES WITHIN STORAGE NETWORK

FIELD OF THE INVENTION

The present invention generally relates to systems for managing data storage, and more particularly, to systems and techniques which provide control of various heterogeneous devices within a networked data storage environment.

BACKGROUND OF THE INVENTION

The vast growth of information service and data processing industries has resulted in a need for computer systems to manage and store large amounts of data. As an example, financial service businesses such as banks, mutual fund companies or the like often operate large and complex data processing systems that require access to many hundreds of gigabytes or even terabytes of data. Data storage system developers have responded to these types of data storage requirements by integrating large capacity data storage systems into networks called "storage networks".

As this name implies, a storage network is a collection of data storage systems that are networked with each other and with a number of host computer systems that operate as servers to serve data stored in the data storage systems. In a typical implementation, one or more connectivity devices, such as high speed data switches, interconnect the various data storage systems to each other and to one or more servers of the computer systems (servers) that require access to (e.g., read and/or write) the data in the data storage systems. As the servers access (e.g., read and/or write) the data, the data switches channel the data access requests (e.g., data read requests, data write requests) to the appropriate data storage systems within the storage network.

A network management station is also included in a typical data storage network. Generally, the network management station manages the servers, data switches, and data storage systems the comprise the storage network. To do so, the network management station includes management software that can remotely control, manage and configure components of the data storage network. By way of example, the management software can configure allocations of storage network resources (e.g., one or more data storage volumes) to specific hosts or groups of host computer systems (e.g., servers or other computer systems that require access to data in the storage network). Storage network resources that can be managed in this manner include, among other things, disk partitions, volume configurations, and access control mechanisms within the data storage systems and the data switches. In some storage networks, the network management station and associated management software allows a network administrator or systems manager (a person responsible for managing the storage network) to establish "zones" of related resources within the storage network.

Generally, a zone of resources within a storage network is an association, relation or grouping of resources (e.g., servers, switch channels, portions of data storage) that are arranged according to function or location. By way of example, a network administrator can use conventional vendor-supplied (i.e., manufacturer supplied) storage network management software to configure a zone of ports (data communications channels or paths) within that vendor's data switch to associate certain servers in the data storage network with certain allocations of data storage within one or more of the data storage systems in the data storage network. Thus, the network administrator might, for example, define a zone to include a server or group of servers, a dedicated channel through the data switch (via allocation of one or more ports), and an amount of data storage space in the form of one or more volumes of storage maintained within one or more of the data storage systems. An administrator might create such a zone in the storage network, for example, for each department (e.g., engineering, accounting, human resources, and the like) within a company.

A data switch (one or more) that channels requests for data between the various data storage devices and server computer systems is generally responsible for zone enforcement. In operation of a typical data switch, each port within the data switch is dedicated to transferring data to and/or from a single respective data storage system or server computer system. To create a zone, the management software causes the data switch to establish a grouping of one or more server ports (i.e., connections between the data switch and a server) with one or more data storage system ports (i.e., connections between the data switch and a data storage system) together into a zone. Generally, resources (servers, switch ports, and portions of data storage systems) within the same zone can "see" or access each other, while resources in different zones cannot access each other. As an example, a server in a first zone can access data storage in the first zone, but not data storage allocated to other zones. Thus, zoning in the context of storage networks operates as a form of access control and provides an organized mechanism of managing and associating amounts of data storage to specific computer systems.

Typically, a network administrator creates a zone of servers and associated storage resources for an intended purpose. For example, an administrator might place accounting servers and accounting data into an accounting zone, while engineering servers and engineering data storage resources might be placed into an engineering zone.

Most manufacturers of storage network equipment (data storage systems and data switching equipment to handle data access requests) provide some form of zoning capabilities within vendor-supplied management software that is specifically designed to manage devices manufactured by that vendor's data storage network equipment product line. As noted above, most manufactures implement zoning within the data switching equipment as this equipment serves as the central data transfer point to handle the transfer of data access requests between server computer systems and the data storage systems which store the data.

SUMMARY OF THE INVENTION

Though zoning is a common characteristic in storage network equipment (e.g., data switches) made by different manufacturers, the commands and interfaces used to control zoning within a particular manufacturers equipment are often specific to that manufacturer. As an example, commands used to control zoning within a data switch for use in storage networks manufactured by IBM Corporation might differ from commands used to control zoning within a data switch for use in storage networks manufactured by EMC Corporation. Other data storage network manufactures and vendors such as Brocade Communications Incorporated, Hitachi, Mercury Computer Systems, and the like might each provide a set of zoning control and configuration commands that differ from each other. These zoning control commands are typically implemented within vendor supplied and vendor specific management software applications. Such conventional zoning control and management applications cannot control zoning in devices made by other vendors. This may be problematic if a customer desires to use storage network equipment made by different manufacturers within the same storage network.

For instance, if a customer uses a data switch from IBM Corporation and another data switch from Hitachi Corporation in the same data storage network, various problems might arise when that customer attempts to configure zoning within each of these different data switches. Each data switch may require that a network administrator perform zoning configuration and control using zoning commands designed and developed by the specific manufacturer of the switch, as implemented within that manufacturer's storage network management software. As such, the network administrator might be required to operate two different storage network management software applications. One storage network management application might be provided from IBM to provide proper control of zoning in the IBM data switch, and another storage network management application might be provided from Hitachi to properly control zoning in the Hitachi data switch. Each network management application might have a different user interface and each may operate quite differently from the other. Each management application might also require the customer to have knowledge of different installation and configuration procedures and may require separate payments of software licensing fees. Generally, overhead increases if a customer must maintain, learn and operate different storage network management applications from different manufacturers in order to manage, configure and control different data storage network equipment installed in the same data storage network.

The present invention addresses these and other issues concerning the incompatibilities and difficulties encountered when a customer desires to use data storage networking equipment from different vendors or manufacturers in the same data storage network. While the present invention specifically addresses such issues with respect to zoning control in a data storage network, the invention is also generally applicable to overcoming similar issues with respect to the operation of similar features (e.g., access control, device management, and so forth) that are present within storage network devices from various manufacturers in cases where those features are controlled or configured differently from each other.

More specifically, the present invention provides mechanisms and techniques that provide a management station which includes a management application that can control zoning within devices manufactured or provided from different vendors within a network such as a data storage network. The management application can receive a generic zone control command from a user to control zoning within a device in the network. The management application can then translate the generic zone control command to one or more vendor specific device zone control commands in a vendor specific device command set that is specifically designed to control zoning within devices from that vendor/manufacturer. To perform the translation, the management application can identify the vendor of one or more devices that are affected by the generic zone control command. Based in this identification, the management application can select and load an appropriate vendor device command set. The generic zone control command may be in a format that is readily compatible with the vendor specific device command in the vendor specific device command set. However, if needed, the management application can also access a command mapping that maps (i.e., that matches) parameters for the generic zone control command(s) to parameters of the vendor specific zone control commands. Thus translation may include simply calling the vendor specific command based on the generic command, or the generic command may be mapped to the vendor specific command.

Once translated, the management application can perform the vendor specific device commands to control zoning in devices from that vendor in the network. Vendor specific device command sets may be dynamically linked libraries, for example, which can be loaded into memory as needed. A typical device in which zoning can be controlled in this manner is a data storage network switch that channels data between servers and data storage systems in a data storage network. Since the management application can control zoning in devices made by different vendors/manufacturers which are installed in the same network, a system manager does not need to load vendor specific management applications onto the management station, nor do they need to learn each user interface for each vendor specific management application.

According to one embodiment of the invention, a method is provided for controlling zoning within a device. The method comprises the steps of receiving a generic zone control command, translating (i.e., either directly calling or mapping and then calling) the generic zone control command to at least one vendor specific device command of a plurality of vendor specific device commands that respectively control zoning in a plurality of different vendor devices, and performing (e.g., executing) the at least one vendor device command to control zoning in a device. Since the generic zone control command is translated to one or more vendor device commands chosen from a database of vendor device commands (e.g., vendor command sets) that can control zoning in devices from different vendors, the method allows a single mechanism, such as a management application that incorporates the method, to be used to control zoning in many different devices from many different vendors in the same network, such as a data storage network.

According to another method embodiment of the invention, the step of translating includes steps of identifying a vendor of at least one device within the zone corresponding to the generic zone control command and selecting a set of vendor specific device commands, from the plurality of vendor specific device commands, that corresponds to the vendor of the device within the zone. The method also includes the operation of mapping the generic zone control command to at least one vendor specific device command within the set of vendor specific device commands. In this manner, the mapping operation can determine the vendor of a device which is affected by the generic zone control command and can choose a vendor specific device command set based on this vendor identification.

According to another embodiment of the invention, the step of selecting selects the set of vendor specific device commands that are specific to a vendor of a device within the zone to which the generic zone control command is directed. For example, in a management application that uses this method embodiment, if the management application receives a generic zone control command to control zoning (e.g., to configure a port to be included in a zone) in a data network switch manufactured by EMC Corporation, the management application can identify EMC as the vendor of the switch and can load an appropriate command set (e.g., an EMC supplied dynamically linked library of data network switch routines) that can specifically control zoning in the EMC switch affected by that generic zone control command. Once loaded, the management application can map the generic zone control command to one or more EMC specific zone control commands within that command set. It is to be generally understood that those skilled in the art are familiar with dynamically loading libraries into software applications to allow such application to access functions or routines within those libraries.

In yet another embodiment, the step of identifying includes steps of identifying a zone that is affected by the generic zone control command and identifying devices within the zone that are affected by the generic zone control command and identifying vendors of the devices within the zone that are affected by the generic zone control command. These operations allow a management application to determine which vendor specific command sets will be required to properly carry out the intended function of the generic zone control command.

In another embodiment, the plurality of vendor specific device commands include sets of vendor specific device commands (e.g., commands that are specific to controlling functions of devices, such as zoning, from a specific vendor). In this embodiment, the step of translating includes the steps of selecting a set of vendor specific device commands that can control zoning within a device to which the generic zone control command is directed and dynamically loading the set of vendor specific device commands into a management application to allow the management application to control zoning within the device to which the generic zone control command is directed. Since the vendor specific device command sets can be dynamically loaded, for example, into a memory system, a management application employing this technique can control zoning in hardware added into a network at anytime, even after the management application has commenced processing. That is, hardware can be added to a network anytime as long as the management application is provided with a database or other resource containing the vendor specific commands sets to control zoning in the new hardware. When zoning control is attempted on the new hardware via the management application, the management application can select the proper zoning control commands, for example, based on an identification of the vendor of the new hardware.

In an alternative embodiment, the step of translating includes steps of selecting the vendor specific device command (one or more), within the set of vendor specific device commands, that performs zoning operations in the device to which the generic zone control command is directed in accordance with the generic zone control command and mapping parameters of the generic zone control command to parameters of the vendor specific device command(s) to provide the vendor specific device command(s) with data required to perform the zoning operations in the device. A command mapping or other data structure (e.g., linked list, object or relational database, etc.) may be used to indicate how parameters of the generic zone control command(s) properly map to parameters of vendor specific zone control command(s).

In yet another embodiment, the step of receiving receives the generic zone control command from a device management application that can control zoning in a network of devices from different vendors. Since devices from different vendors may be incorporated into the same network and zoning in these devices may be managed by the management application provided by this invention, there is no need to use management applications provided for each specific vendor of each specific device to control zoning. This saves significant learning time on behalf of a network administrator or a systems manager since that person need not learn specific vendor management application software interfaces.

In another alternative embodiment, the step of performing performs the vendor specific device command to control zoning within a device from a vendor that is a vendor of devices that are controlled by the specific vendor specific device command to which the generic zone control command is translated. That is, vendor specific zone control commands provided from a vendor of the device affected by the generic zone control command are used to control zoning.

In still another embodiment, the step of translating includes the step of loading a library of vendor specific device commands into a management application based on a vendor of a device affected by the generic zone control command to allow the management application to perform vendor specific device commands in order to carry out the generic zone control command within the device affected by the zoned control command.

In another method embodiment, the steps of receiving, translating and performing are processed by a management application that controls zoning within devices in a data storage network. In this embodiment, the step of translating includes a step of loading a dynamically linked library of vendor specific device commands, selected based on a vendor of a device affected by the zoning control command, into a memory for use by the management application to control zoning in the device.

The present invention also provides other embodiments which include a computer system configured to control zoning in a plurality of devices from different vendors in a network. In such embodiments, the computer system comprises an input-output interface, a processor and a memory system coupled to the processor and to the input-output interface and encoded with instructions that form a multi-zone management application. When the multi-zone management application is performed on the processor (e.g., executes, interprets or otherwise processes), it causes the computer system to receive, via the input-output interface, a generic zone control command and to translate the generic zone control command to at least one vendor specific device command of a plurality of vendor specific device commands (e.g., selected from a library via a command mapping) that respectively control zoning in a plurality of different vendor devices coupled to the input-output interface. The computer system also performs, via the multi-zone management application in the memory system, the vendor specific device command(s) to control zoning in a device coupled to the input-output interface. In other words, once the generic zone control command is translated to one or more vendor specific commands, the management application performs the vendor specific commands to control zoning in devices made by the vendor who supplied to vendor specific commands. In an alternative embodiment, the computer system also includes a multi-zone command database containing the plurality of vendor specific device commands and command mappings which can be loaded into the memory system upon identification of specific vendors of devices to which generic zone control commands are directed.

According to other embodiments of the invention, the processor performs (e.g., executes, interprets or otherwise processes) instructions, code or logic (e.g., a software module, library, program, or the like) that is encoded into the memory system to provide all of the operations disclosed in the method embodiments (i.e., steps, operations) and configurations summarized above and as explained herein.

Other embodiments include a computer system configured as a management station to perform all of the aforementioned methods via software control, or via hardware and/or software configured to perform those methods and the techniques disclosed herein as the invention.

Other embodiments of the invention that are disclosed herein include software programs to perform the operations summarized above and disclosed in detail below. More particularly, a computer program product is disclosed which has a computer-readable medium including computer program logic encoded thereon to provide the methods for controlling zoning within a device according to this invention and its associated operations. The computer program logic, when executed on at least one processor within a computing system, causes the processor to perform the operations (e.g., the method embodiments above, and described in detail later) indicated herein. This arrangement of the invention is typically provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software or firmware or other such configurations can be installed onto a computer system to cause the computer system to perform the techniques explained herein as the invention.

It is to be understood that the system of the invention can be embodied strictly as a software program, as software and hardware, or as hardware alone. Is also to be understood that the management application of this invention typically performs (e.g., executes, runs, or is otherwise operated) on a management station coupled to a data storage or other type of network. The management station is generally networked but is typically a dedicated computer system, personal computer or workstation operated by a network or systems administrator or manager. In alternative arrangements however, the management application of this invention may reside on a computer system located elsewhere on the network and the user (e.g., systems manager) that provides the generic zone control commands may be located elsewhere on the network and may be communicating with the management station over a network connection (e.g., WWW or other browser-type interface, command-line interface, messaging interface, E-Mail, or another protocol or interface). Moreover, the multi-zone command database may be local to, or remotely located from the management station and may be any type of database or storage mechanism that can store data.

An example implementation of the invention that incorporates certain of the aforementioned embodiments is the Enterprise Control Center (ECC) software management application manufactured by EMC Corporation of Hopkinton, Mass. which can control devices in data storage networks.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 4 is a flow chart of high-level processing steps showing operations performed by embodiments of this invention.

FIG. 5 is an example of a command mapping which maps generic zone control commands to vendor device specific zone control commands according to an example embodiment of this invention.

DETAILED DESCRIPTION OF PREFERRED EMBODIMENTS

Figure 1:
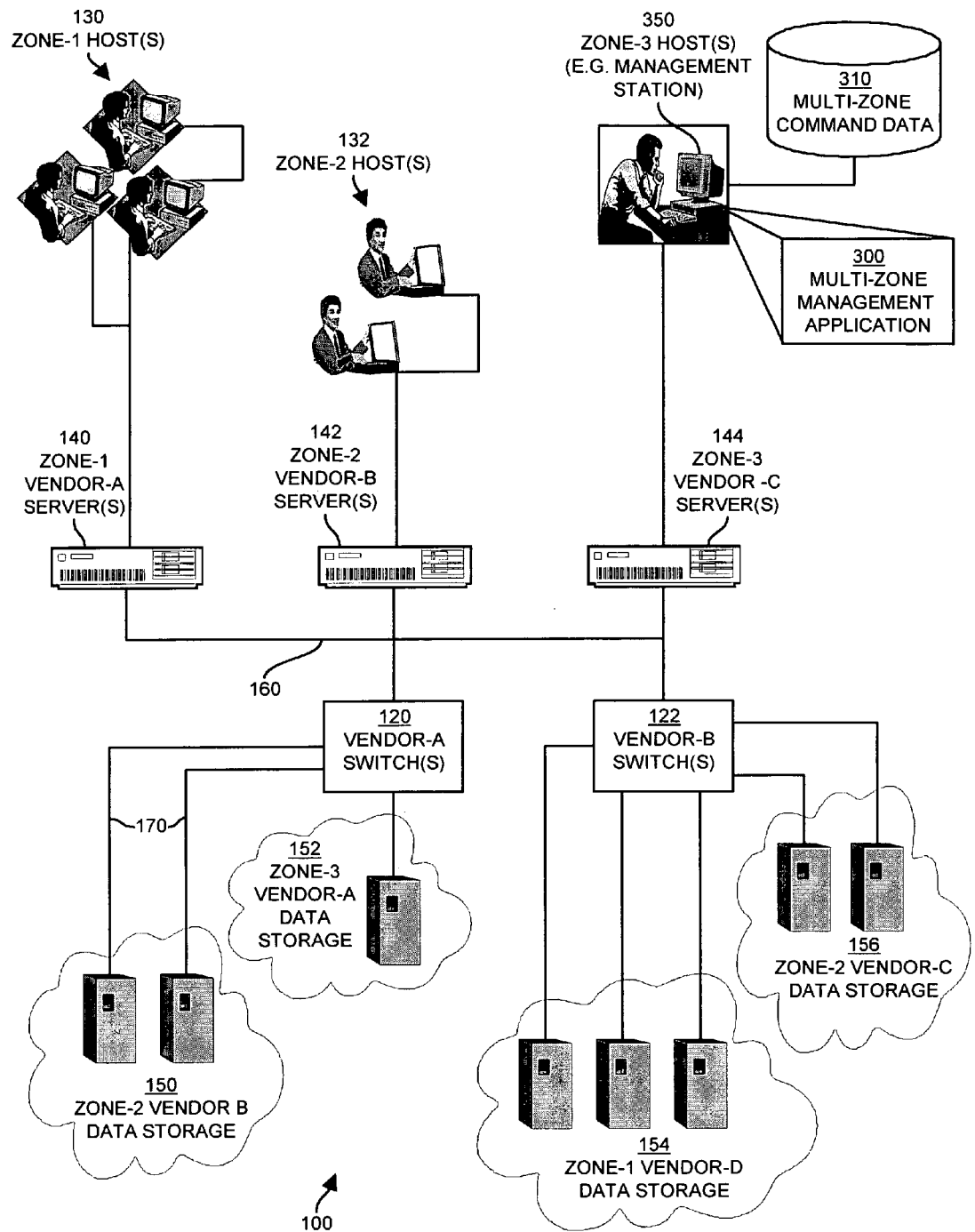
FIG. 1 illustrates an example of a data storage network and computing system environment that is suitable for use in describing example operations of a management station configured with a software management application in accordance with embodiments of the invention.

The present invention provides techniques and mechanisms that allow a systems manager (person responsible for management and control of computing systems and/or other components) to control and configure different devices produced by different manufacturers that co-exist and operate together within a single data storage network. In particular, the invention allows a single network management application (e.g., software program) to control zoning in various data storage network devices such as switches that each might require a different command set or a different application programming interface (API) for zoning control.

Generally, a management application configured with this invention provides a generic set of data storage network administration zoning control commands for selection and use by the systems manager. When the systems manager selects a generic zoning control command, such as "ADD STORAGE DEVICE XYZ TO ZONE 1," the system of the invention can determine what devices (e.g., what switch(es) in the network) are (or will be) specifically required or involved to perform this zoning command. Once this is determined, the management application can access the appropriate vendor-specific command set(s) that will allow this zoning command to be carried out within the specific devices (e.g., vendor switches). The vendor-specific command sets can be dynamically linked libraries, for example, that provide functionality to control zoning in a specific vendor switch in the storage network. The management application loads the appropriate vendor specific command set(s) and performs the generic zone control command using any required corresponding vendor specific command(s) contained within the vendor-specific command set.

It may be the case that the generic zone control command is identical in nature to a command in the vendor specific command set, in which case the generic zone control command essentially is the same command with the vendor specific command set. In an alternative case, the invention may need to map, translate or otherwise convert the generic zone control command to one or more vendor specific commands (e.g., map parameters of generic command to parameters of vendor specific command). Since the management application provides generic zone control commands that correspond to zone control commands in each manufacturers command set, zoning control can be implemented in a standard fashion irrespective of the specific zoning control application programming interfaces required for each device from each different device manufacturer or vendor.

Moreover, in the case where the generic zone control commands are the same as (i.e., are in the same format with the same command name, parameters, etc.) the vendor specific commands, no mapping is needed and the management application can simply load the required vendor specific command set and call commands within this set (via the generic commands that are the same) to carry out zone control operations. No mapping of commands may be needed in this case. In cases where there may be difference in the generic and vendor zone control commands and a mapping is needed, the invention may provide the mapping ahead of time as a "wrapper" to the vendor specific command set that serves to translate the generic zone control commands to vendor specific commands. Alternatively, the mapping of such commands may be done in real-time.

FIG. 1 illustrates an example of a data storage network 100 in which the present invention operates. Generally, the data storage network 100 includes servers 140, 142 and 144, data storage network switches 120, 122 and a plurality of data storage systems 150 through 156. Also included are arrangements of network hosts 130, 132 and 350. Host 350 operates as a network management station and performs (e.g., executes) a multi-zone management application 300 that accesses multi-zone command database 310. A systems manager operates the network management station 350 via the multi-zone management application 300 to configure and control zoning within, for example, the data storage network switches 120, 122. Since switches 120, 122 operate to couple servers 140 through 144 to data storage devices 150 through 156, zoning within the switches 120 and 122 essentially allows ports (not specifically shown in this figure) in the switch that couple the servers and data storage systems to be grouped together in zones. Thus zoning is primarily carried out by the switches 120, 122.

In this particular example, the data storage network 100 is configured into three zones (zone-1, zone-2, zone-3). As noted above, the zones in this example are essentially groupings of ports within the switches 120, 122. Zone-1 includes the zone-1 hosts 130, the zone-1 server 140, and the zone-1 data storage systems 154. Zone-2 includes the zone-2 hosts 132, the zone-2 server 142, and the zone-2 data storage systems 150 and 156. Zone-3 includes the zone-3 host 350 (i.e., the network management station in this example), the zone-3 server 144, and the zone-3 data storage systems 152. The data storage network switches 120, 122 are configured to support and enforce the zones within the data storage network 100.

Of particular importance to this example embodiment of the invention is that different vendors or manufacturers produce the various switches 120, 122 (as well as other devices) installed within this example data storage network 100. In other words, the data storage network 100 is a composition of various heterogeneous components that may each operate or be controlled somewhat differently from each other. For instance, data storage network switches 120, 122 are manufactured by vendors A and B respectively. Each vendor-specific switch 120, 122 may require the use of vendor-specific command set(s) to control and configure zoning with that switch.

In contrast to this invention, in a conventional data storage network (not shown here), a vendor may provide a vendor specific network management application that includes an appropriate command set to control zoning within that vendor's switches. If a conventional data storage network were to use switches from multiple vendors, a systems manager would be required to operate multiple management applications (one for each different vendor) to manage zones in each switch since each different vendor switch requires the use of vendor specific zone control commands to manipulate zoning within that vendors' devices. In other words, conventional or prior art zoning control requires the use of vendor specific management applications equipped to exclusively operate with only the vendor specific commands associated with switches manufactured from that vendor and do not allow control of, for instance, zoning in many different switches from many different vendors.

Conversely, the multi-zone management application 300 configured with embodiments of this invention allows a systems manager, using this single multi-zone management application 300 (equipped with components on the invention), to control and configure zoning within the data storage network switches 120, 122 in the data storage network 100, irrespective of which vendor produces or provides such switches. This is accomplished, as will be detailed below, since the multi-zone management application 300 has access to multi-zone command database 310.

Multi-zone command database 310 includes vendor specific command sets to control zoning within switches produced or provided from specific vendors. As will be explained further, the multi-zone management application 300 of this invention presents a single set of generic zone control commands to the systems manager via the management station 350. Upon selection of a generic zone control command, the multi-zone management application 300 performs or carries-out the generic zone control command within a specific vendor switch using one or more vendor specific device zone control commands obtained from the multi-zone command database 310.

FIG. 1 thus illustrates the power which is inherently provided by the system of the invention to allow a network designer (e.g., systems manager) to design a network using components such as switches from different vendors without regard to maintaining separate management applications. In particular, a systems manager may initially create a data storage network (e.g., 100) using, for example, a data storage switch from vendor-A (e.g., switch 120), and then, at a later time may decide to purchase a data storage switches from another vendor (e.g., vendor-B data storage switch(s) 122) and incorporate these switches into the same data storage network. The invention thus avoids the problem of a network manager having to learn how to operate a second network management application to administer zoning in the switches from another vendor. To implement data storage network services such as zoning, which may vary in operation, control and configuration from vendor to vendor, the invention saves significant time and eliminates the need to modify the network management application with the addition of new vendor switches to the network.

Figure 2:
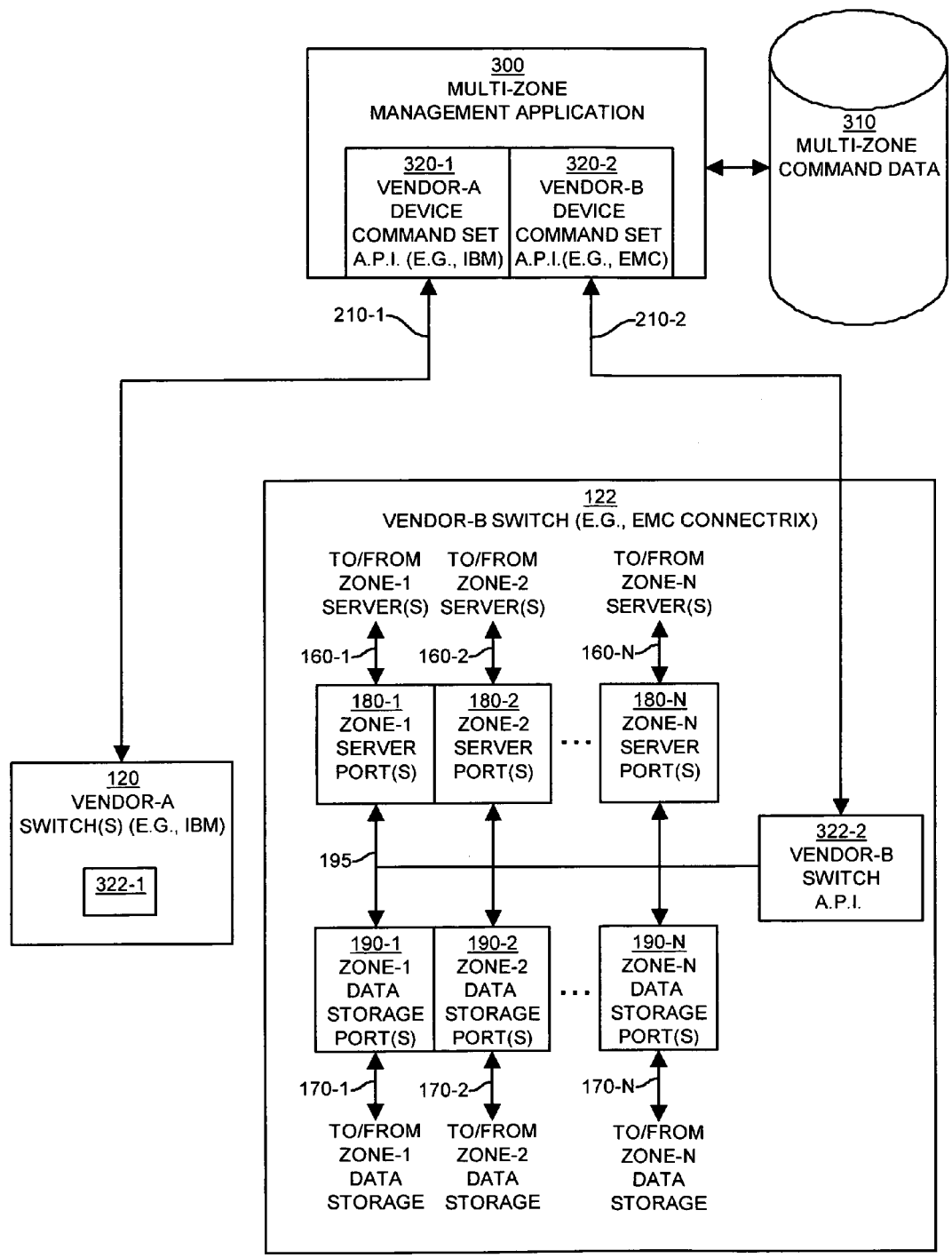
FIG. 2 illustrates an example interface between the multi-zone management application of this invention and a vendor specific device, which is a data storage network switch in this example.

FIG. 2 illustrates in more detail the interaction between the multi-zone management application 300 and the vendor specific data storage network switches 120 and 122. FIG. 2 illustrates vendor-B's data storage switch 122 in detail. The configuration and operation of vendor-A's data storage switch 120 is similar except that Vendor A's switch 120, as will be explained, requires functionality provided by Vendor-A's device command set 320-1 while Vendor-B's switch 122 requires functionality provided by Vendor-B's device command set 320-2.

In this example configuration, the multi-zone management application 300 includes vendor specific device command set application programming interfaces(APIs) 320-1, 320-2 which communicate via interfaces 210-1 and 210-2 with respective vendor switches 120, 122 which each include vendor switch application programming interfaces (APIs) 322-1 and 322-2. The respective interface pairs 320-1, 322-1 (between the application 300 and the vendor-A switch 120) and 320-2 and 322-2 (between the application 300 and the vendor-B switch 122) operate according to zoning commands sets, interfaces, and/or protocols specified and/or required by the specific vendors (A and B in this example) of the switches 120, 122. In this particular configuration, the vendor specific device command set APIs 320-1 and 320-2 comprise vendor specific device commands and functionality that control zoning in respective switches 120, 122 manufactured or supplied by the vendors that provide the APIs 320-1 and 320-2. Actual command syntax and/or parameters (e.g., formats of function calls) to zoning control commands within each vendor specific command set 320-1 and 320-2 might be the same (or similar, as will be explained) but the underlying functionality required to manipulate the individual vendor switches 120, 122 might vary from vendor to vendor. In other words, the function calls to control zoning from vendor to vendor might be the same or similar, but they way each vendor goes about implementing those zoning operations within that vendor's switch 120, 122 might be different, hence the need for separate vendor specific device command sets 320-1, 320-2.

The multi-zone management application 300 using this invention obtains the vendor specific device command set APIs 320 from the multi-zone command database 310 which stores a plurality of vendor specific device command sets 320 for the various vendors corresponding to switches (in this example) in the data storage network 100. The vendor specific device command set APIs 320 may be dynamically linked libraries (dlls), for example, which include functions, routines or procedures which the multi-zone management application 300 can perform to configure and control zoning in the respective vendor devices, such as vendor switches 120,122, as shown in this example.

FIG. 2 also illustrates how zoning may be implemented within a particular vendor switch (122 shown in detail in this example). As noted in the background section above, a typical data storage network switch includes a plurality of ports to which servers and data storage systems (and possibly other devices) can connect. In this example, the switch 122 includes server ports 180-1 through 180-N and data storage ports 190-1 through 190-N. The ports 180 and 190 are coupled via a switch fabric 195. The vendor-specific switch API 322-2 within the switch 122, under direction of vendor specific commands from the vendor-B device command set 320-2, can control the switch fabric 195 to configure which ports (both server ports and data storage ports) are allocated to which zones. In other words, by pairing server ports 180 and data storage ports 190 with each other to form a zone, servers and data storage systems connected to those ports are thereby inherently allocated or included in that zone. By way of example, server port 180-1 is dedicated or allocated to zone-1 and handles the transfer of data to and from the zone-1 server 140 (FIG. 1) via interface 160-1. Likewise, data storage port 190-1 is also allocated or included in zone-1 (due to control by vendor switch API 322-2) and handles, via the interface 170-1, the transfer of data to and from data storage systems 154 which are also in zone-1.

While this example illustrates a one-to-one mapping between server ports 180 and data storage ports 190 to form a zone, it should be understood that many-to-one mappings also possible. For example, a single server port 180 which couples a server (e.g., 142, FIG. 1) that serves many hosts (e.g., zone-2 hosts 132) may be "zoned" to multiple data storage ports 190 within the same data storage switch 122. The vendor specific switch API 322-2 controls the zoning association of ports (one or more server ports 180 paired with one or more data storage ports 190 to form a zone) based on the vendor specific commands received from the vendor specific device command set API 320-2 over interfaces 210-2.

In this embodiment, the vendor specific device command set APIs 320 can be dynamically loaded as needed by the multi-zone management application 300. As will be explained further, the multi-zone management application 300 is able to identify a vendor of a switch (e.g., is able to determine that EMC Corporation manufactures switch 122) within a zone corresponding to a generic zone control command. In a preferred embodiment, the systems manager selects a generic zone control command (not shown) in the multi-zone management application 300 which specifies a zone, particular devices or resources within a zone, and a manner in which the devices or other resources in that zone are to be configured or controlled. The management application 300 can then properly select (i.e. load in the case of a dll), based on the vendor of the switch, the proper set of vendor specific device commands that provide the vendor device control API 320 (320-2 for the EMC switch 122) based on the identity of the vendor of the specified device(s) or resources. Thereafter, generic zone control commands given to the management application equipped with the invention can be performed using the vendor specific commands within the selected (i.e., loaded) vendor specific command set.

Figure 3:
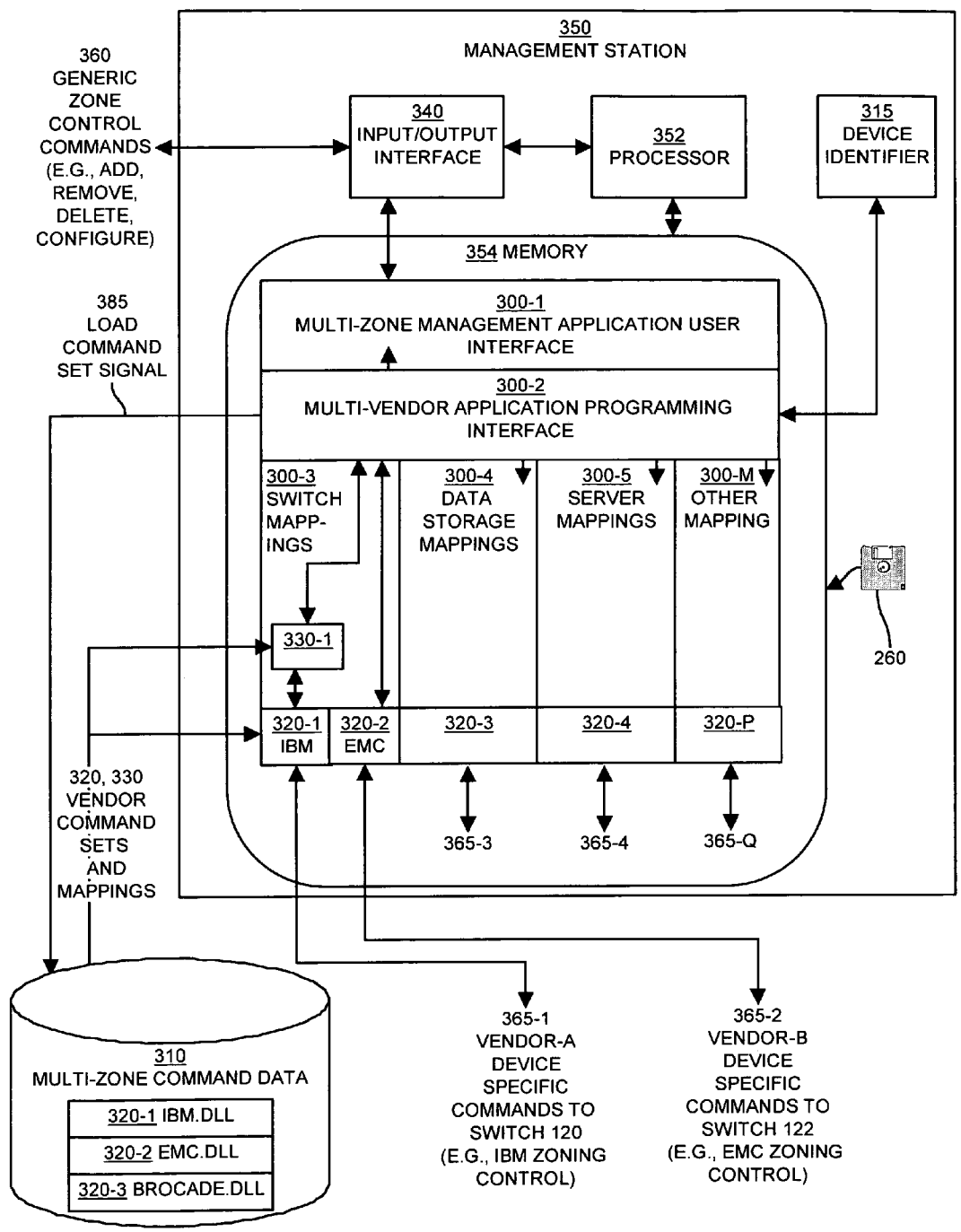
FIG. 3 illustrates an example software architecture of the multi-zone management application as implemented within a management station configured in accordance with this invention.

FIG. 3 illustrates an example software architecture implemented within a management station 350 configured with the invention. The management station 350 includes an input/output interface 330, a processor 352, a device identifier 315 and a memory system 354. The memory system 354 is encoded with a multi-zone management application user interface 300-1, a multi-vendor application programming interface 300-2, and groups of mappings 300-3 through 300-M. These components are incorporated into the multi-zone management application 300. The mappings 300 further include switch mappings 300-3, data storage mappings 300-4, server mappings 300-5, and other mappings 300-M. By way of example, the set of switch mappings 300-3 contains any required vendor specific command mappings (330-1 in this example) that map or translate (as will be explained) parameters of the generic zone control commands 360 directed to the IBM switch 120 to parameters of the specific IBM device zone control commands 365-1. Also shown in this figure are the vendor specific device commands sets 320-1 through 320-P. With respect to zoning control, vendor specific device command sets 320-1 and 320-2, as explained above, contain the vendor device specific commands 365 to control zoning in particular vendor switches within the data storage network 100. The management station 350 also contains a coupling to the multi-zone command database 310 which maintains copies of the vendor specific device commands sets 320-1 through 320-P (only a 320-1 through 320-3 shown due to drawing space limitations).

It is to be understood that while the preferred embodiments of this invention relate to zoning control within different vendor switches in a data storage network, FIG. 3 and the invention as a whole for that matter are meant to be general in nature such that other vendor specific functionality or services beside zoning (e.g. device discovery, by way of example only) are supported by the generic control commands provided by a management application equipped with this invention. That is, while the specific implementations described here operate to control zoning in different vendor device, the same concepts can be applied to other mappings 300-4, 300-5, 300-M (if required, as will be explained) and other vendor command sets 320-3 through 320-P in FIG. 3. Such other vendor command sets 320-3 through 320-P can be used by the system of the invention in a similar manner as the zoning command sets 320-1, 320-2 to allow generic control commands to control other services or functionality (beside zoning, which is primarily done within switches), such as discovery for example, which are performed in conjunction with other vendor devices besides switches. Accordingly, generic commands 360 for other services may be performed by the invention using mappings 300-4 through 300-M (if required) and vendor specific command sets 320-3 through 320-P to produce vendor specific commands 365-3 (for specific vendor data storage systems), 365-4 (for specific vendor servers), and 365-Q (for any other vendor devices). The operation of the management station 350 illustrated in FIG. 3 with respect to zoning control only will now be discussed in conjunction with the high-level flow chart of processing steps shown in FIG. 4.

In operation of the management station 350, a user (e.g., systems manager, not specifically shown) selects generic zone control commands 360 (e.g., to configure zones within switches) via the input/output interface 340. The multi-zone management application user interface 300-1, which is preferably a graphical user interface, provides a set of generic zone control commands (not specifically shown, but referenced in the figure generally as 360) to allow a systems manager to control zoning with the various switches 120, 122 in the data storage network 100 (FIG. 1). When a user selects a generic zone control command 360, the multi-zoned management application user interface 300-1 receives the zone control command 360 (Step 400, FIG. 4) for further processing.

As previously explained, zoning allows a systems manager to group various resources (e.g., devices coupled to switches) together to allow those resources to access each other through a switch while at the same time disallowing access to those resources from devices or other resources not included in the zone. Examples of typical zone control commands 360 include "ADD" to add a resource (e.g., storage space, switch port, server) to a zone, "REMOVE" to remove a resource from a zone, "DELETE" to delete a zone entirely and "CONFIGURE" to otherwise configure a zone in a particular manner. Zone control commands, whether they be generic or specific to a device, typically include one or more parameters which specify, for instance, a resource associated with the zone (e.g., data storage system to be added, removed, or otherwise configured within the zone).

In step 400, the multi-zone management application user interface 300-1 receives and passes the generic zone control command 360 to the multi-vendor application programming interface 300-2. In step 401, the multi-zone management application 300 loads the appropriate set of vendor specific commands (320-1 or 320-2 in this example), as selected from a group of command sets from different vendors. Once the proper vendor specific command set 320 is loaded, in step 402, the management application 300 performs or processes (i.e., executes) the generic zone control command within the appropriate vendor's switch (either 120, 122 in this example).

In one embodiment, to do so, the multi-vendor application programming interface 300-2 uses the device identifier 315 to identify a vendor of the switch(es) that is/are affected by the generic zone control command 360. This may be done, for example, by a device identifier table (not shown) within the device identifier 315 that matches switch identities (i.e., network addresses) with vendor identities. An entry in such a device identifier table might indicate, for example, that the data storage network switch 120 (FIG. 2) is manufactured by IBM Corporation. Another entry may indicate that the data storage network switch 122 (FIG. 2) is manufactured by EMC Corporation. Based on the identification of a vendor in response to receipt of a zone control command 360, the multi-vendor application programming interface 300-2 then sends a load command set signal 385 to the multi-zone command database 310 in order to obtain the appropriate specific set of vendor specific device commands 320 that the multi-zone management application 300 can use to specifically control zoning within the switch(es) identified as being affected by the zone control command 360. In response to this command, the multi-zone command database 310 returns the vendor specific device command set 320 for the specified (i.e., identified) switch/vendor and places/loads the command set(s) 320 into the memory system 354. As noted above, the vendor specific device command sets 320 which are loaded into memory 354 in this manner may be dynamically linked libraries, for example, which the multi-vendor application programming interface 300-2 can dynamically link into to obtain access to the proper functions, routines, procedures and/or the like in order to control zoning in a specific vendor device.

In a preferred operation of the invention, function calls to zoning control functions within the vendor specific command sets 320 are of the same name, syntax and/or parameter formats as the generic zone control commands 360 to which those vendor specific functions correspond. In such cases, no special switch command mappings 300-3 are required since the generic zone control commands 360 are the same format as zoning commands 365 used by the switch vendors. This is illustrated in FIG. 3 by the arrow passing uninterrupted from the multi-vendor API 300-2 through the switch mappings 330-3 to the EMC vendor specific command set 320-2. In other words, EMC specific commands to control zoning follow the same conventions, format and syntax as the generic zone control commands and thus no command mappings 330 are needed.

However, in some instances, there may be differences between the name, syntax, parameter placement and/or parameter values of one or more generic zone control commands 360 and the zone control function (or functions) 365 within the vendor specific device command sets 320 that are executed to carry out the generic zone control commands within a specific vendor switch. In such cases, a command map 330 is required to map or translate the generic zone control command 360 to a format acceptable by the vendor specific command sets 320.

The system of the invention may include one or more command mappings 330 which describe how to map or pass generic zone control command (e.g., 360) function names, parameters and/or their associated values to one or more vendor device specific command (e.g., 365) names, parameters and/or parameters values as required for the vendor specific commands in the vendor specific device command set(s) 320.

FIG. 5 illustrates an example of a specific command mapping 330, which maps generic zone control commands 360 to vendor device specific zone control commands 365-1 for IBM commands 365-1. Both IBM and EMC commands 365-1 and 365-2 are shown in this example mapping 330 however to illustrate how EMC zone control commands 365-2 of the same format as generic command 360 do not need to be specifically mapped, while IBM zone control commands 365-1 do require such a mapping.

In this example command mapping 330, only three generic zone control commands (create-zone, add-to-zone and remove-zone) are shown. It is to be understood that a typical command mapping 330 can contain a mapping for each generic zone control command 360 provided by the user interface 300-1 to corresponding commands for one or more vendors (e.g., IBM and/or EMC, etc). The generic CREATE_ZONE command includes a ZONE parameter, a SERVERS parameter and a DATA_STORAGE_RESOURCE parameter. This particular generic zone control command 360-1 is used to create a zone within a switch (e.g., within switch 120 or 122) by including a server and some data storage in the zone. Note that the EMC zone control command for this same function and the other all appear identical to the generic zone control commands 360. As such EMC commands need no mapping. Thus, if a management application using this invention receives a generic zone control command 360 (e.g., CREATE_ZONE) and determines that the switch to which this command is directed is an EMC switch, the system can simply load the EMC dll containing the EMC functionality to control zoning in EMC switches and can forward the generic zone control command to the EMC command set 320-2.

In the case of IBM zoning control commands however, the command mapping 330 serves to map or translate the generic zone control command 360 into the corresponding IBM zone control command 365-1. In the case of the CREATE ZONE command, the generic parameter SERVERS is mapped to the IBM specific SERVER_ID parameter, and the generic parameter DATA_STORAGE_RESOURCE is mapped to the IBM specific parameter DATA_STORAGE_ID. Other generic zone control commands 360 are mapped to corresponding IBM zoning commands 365-1 in a similar manner. The command mapping 330 thus allows the system of the invention, during operation, to convert generic commands 360 into vendor specific commands 365 within the vendor specific command sets (IBM command set 320-1 for the IBM mapping 330-1 in this example) if needed. Note that the example illustration in FIG. 3 includes an IBM command mapping 330-1 (loaded into memory upon receipt of a generic zone control command directed to an IBM switch, for example) but no mapping for generic zone control commands 360 that are issued to the EMC specific command set 320-2 (i.e., to control an EMC switch) since the EMC commands 365-2, as explained above, correspond exactly in format to the generic zone control commands 360.

If command mappings 330 are required, a software developer (i.e., either a vendor or the developer of the management application 300) may create and install such command mappings 330 into the multi-zone command data database 310 before operation of the management application 300. Alternatively, the management application 300 may create the command mappings 330 in real-time using, for example, hard-coded knowledge or other logic indicating which parameters of a generic zone control command correspond 360 map to which parameters of a specific vendor specific device command 365.

Since the system of the invention provides the systems manager with a set of generic zone control commands 360, the systems manager need not install any vendor specific systems management applications that are conventionally used to control zoning in the vendor specific devices (switches in the case of zoning) installed into the data storage network 100. The systems manager only needs to obtain and install the dynamically linked library or other vendor specific command set 320 (e.g., a vendor supplied dll) into the multi-zone command database 310. Once the systems manager has installed the vendor commands sets 320-1 through 320-P into the command database 310, the multi-zone management application 300 of the present invention can access these functions as explained above to control devices (e.g., control zoning in switches) from many different vendors installed within a single data storage network. As such, the systems manager only needs to learn the multi-zone management application user interface 300-1 of the management application 300, instead of learning many user interfaces provided by different management applications according to each vendor. As new devices such as a new vendor switch are added to the network, as long as the vendor specific command set 320 for that switch is loaded into the database 310 (along with any mapping 330, if required), then the system of the invention can access and control zoning in that switch without modification to the management application 300.

Figure 6:
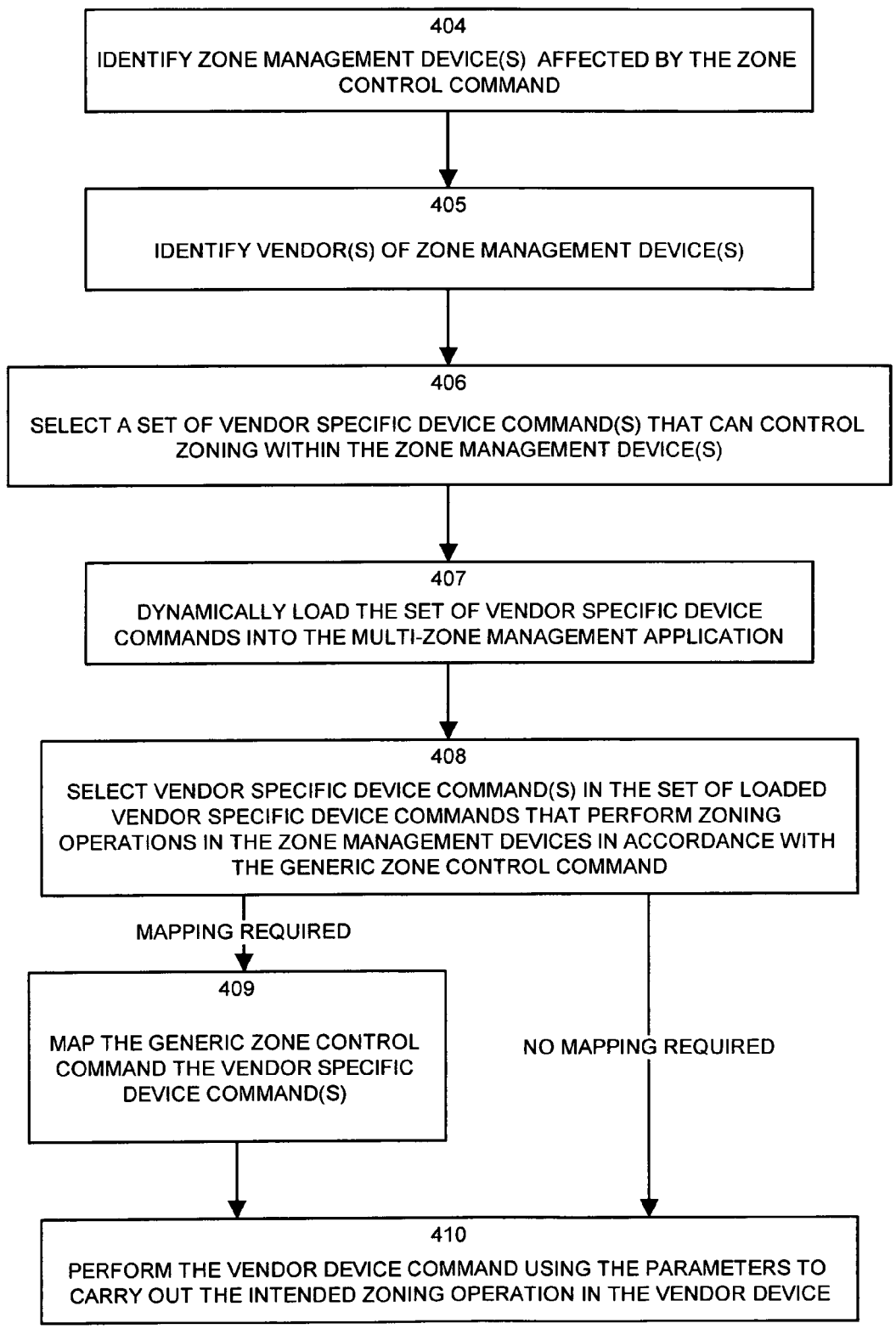
FIG. 6 is a flow chart of processing steps showing in more detailed the operations performed by embodiments of this invention.

FIG. 6 illustrates a series of processing steps 404 through 410 which explain in more detail an example of processing performed by embodiments of the invention. Steps 404 through 410 are typically embodied as software code within the memory system 354 of FIG. 3. During operation of embodiments of the invention, the processor 352 within management station 350 performs (e.g., executes, runs, interprets) this code (e.g., logic instructions). It is to be understood that any type of software development platform can be used to create the multi-zone management application 300 embodied by these steps. Examples of such software development platforms include C++, C, Java, and the like.

After receipt of a generic zone control command 360 (Step 400, FIG. 4), the management application 300, in step 404 in FIG. 6, identifies any zone management devices (e.g., IBM switch 120) within the zone that are (i.e., that will be) affected by the zoned control command 360. Next, in step 405 the management application 300 identifies vendors (e.g., IBM) of the zone management devices identified in step 404. Based on this identification, in step 406, the management application 300 selects an appropriate set or sets of vendor specific device commands (e.g., the IBM command set 320-1) that can properly control zoning within the zone management device (IBM switch 120) to which the generic zone control command is directed. In step 407, the management application 300 dynamically loads the set of vendor specific device commands (i.e., loads the IBM dll 320-1, and mapping 330-1 if present in database 310) into the multi-zone management application 300 (e.g., into memory 354). Next, in step 408, the management application 300 selects one or more vendor specific device commands (e.g., CREATE_ZONE) in the set of loaded vendor specific device commands (e.g., 320-1) that correspond to, and perform the zoning operations in the zone management device(s) (e.g., switch 120) to which the generic zone control command 360 is directed, in accordance with the generic zone control command 360.

In the case of IBM zone control commands, in step 408, the management application 300 determines that the mapping 330-1 is present (i.e., was loaded in step 407) and thus proceeds to step 409. In step 409, the management application consults the appropriate command mapping 330-1 to map the generic zone control command to a vendor specific command (i.e., to an IBM zone control command). As noted above, generally, in step 409, the management application 300 maps any parameters from the generic zone control command 360 to parameters in the vendor specific device commands 365 to provide the vendor specific device command 365 with any data required to properly perform zoning operations in the vendor specific device (e.g., within the switch).

If no mapping is required (e.g., in the case of EMC commands which are identical to generic zone control commands), no command map 330 is present in memory 354 and thus the management application 300 in step 408 can proceed directly to step 410.

In step 410, the management application 300 performs the vendor specific device command(s) 365 (using the parameters obtained in step 409 from the mapping, or obtained directly form the generic zone control command) to carry out the intended zoning operation within the vendor specific switch.

In this manner, the management application 300 is able to dynamically detect devices such as switches from different vendors within a data storage network (e.g., 100) and is able to control zoning within each of those switches using a single consistent multi-zone management application user interface 300-1. By determining the identity of vendors of switches to which generic zone control commands 360 are directed, the management application 300 of this invention can dynamically load the appropriate vendor specific command sets (e.g., 320-1, 320-2) and command maps 330 (if required) to control zoning within any vendor devices without requiring the systems manager to use a separate management application to perform zoning operations in each different vendor device. The invention thus also allows a network designer to incorporate hardware for many different vendors within a data storage network without having to worry about zoning control compatibility issues.

While the example explanations of preferred embodiments presented herein relate to controlling zoning within vendor devices in a data storage network, it is to be understood by those skilled in the art that the mechanisms and techniques of this invention are applicable for control of other types of vendor specific operations (e.g., discovery) within devices installed within a network. For example, the management application 300 might carry out operations such as device power up, device configuration, port control, discovery, or other such operations that require specific vendor libraries of vendor specific control commands by providing an interface of generic commands for such operations which are then mapped to the vendor specific commands within the vendor-specific libraries that perform the operations in a corresponding vendor specific device.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A method for controlling zoning within a device of a storage network, the method comprising the steps of:

receiving a generic zone control command that controls a configuration of zoning in the storage network;

translating the generic zone control command to at least one vendor specific device command of a plurality of vendor specific device commands that respectively control zoning in a plurality of different vendor devices; and performing functions associated with the at least one vendor specific device command to control which of multiple ports in the device shall be grouped together to form a zone through which servers are able to access a data storage system in the storage network; and configuring multiple server ports and multiple data storage ports of the device to be in the zone, the multiple server ports associated with the zone handling a transfer of data between a server and the device, the multiple data storage ports associated with the zone handling a transfer of data between the device and the data storage system.

2. The method of claim 1 wherein the step of translating includes the steps of:

identifying a vendor of the device associated with the zone corresponding to the generic zone control command; and selecting a set of vendor specific device commands, from the plurality of vendor specific device commands that respectively control zoning in devices from different vendors, that corresponds to the vendor of the device within the zone.

3. The method of claim 2 wherein the step of selecting a set of vendor specific device commands selects the set of vendor specific device commands that are specific to a vendor of the device that exists within the zone to which the generic zone control command is directed.

4. The method of claim 2 wherein the step of identifying includes the steps of:

identifying devices associated with the zone that are affected by the generic zone control command; and identifying vendors of the devices associated with the zone that are affected by the generic zone control command.

5. The method of claim 1 wherein:

the plurality of vendor specific device commands include sets of vendor specific device commands; and wherein the step of translating includes the steps of:

selecting a set of vendor specific device commands that can control zoning within the device to which the generic zone control command is directed; and dynamically loading the set of vendor specific device commands into a management application to allow the management application to control zoning within the device to which the generic zone control command is directed.

6. The method of claim 5 wherein the step of translating includes steps of:

selecting the at least one vendor specific device command, within the set of vendor specific device commands, that performs zoning operations, in the device to which the generic zone control command is directed, in accordance with the generic zone control command; and mapping parameters of the generic zone control command to parameters of the at least one vendor specific device command to provide the vendor specific device command with data required to perform the zoning operations in the device.

7. The method of claim 5 wherein the set of vendor specific device commands is selected based on an identity of a vendor of the device to which the generic zone control command is directed.

8. The method of claim 1 wherein the step of receiving receives the generic zone control command from a device management application that controls zoning in a network of devices manufactured by different vendors.

9. The method of claim 1 wherein the step of performing performs the at least one vendor specific device command to control zoning within the device from a vendor that is a vendor of devices that are controlled by the vendor specific device command for which the generic zone control command is translated.

10. The method of claim 1 wherein the step of translating includes the steps of:
  loading a library of vendor specific device commands into a management application based on an identity of a vendor of the device affected by the generic zone control command; and
  calling the at least one vendor specific device command using the generic zone control command having the same format as the at least one vendor specific device command perform zoning operations within the device affected by the generic zone control command.

11. The method of claim 1 wherein the steps of receiving, translating and performing are processed by a management application that controls zoning within switches in the data storage network and wherein the step of translating includes a step of loading a dynamically linked library of vendor specific device commands, selected based on a vendor of the device affected by the generic zone control command, into a memory for use by the management application to control zoning in the device.

12. A method as in claim 1, wherein the steps of receiving, translating and performing are executed by a management application operating in a management station computer system, the management application controlling zoning within switches by transmitting the at least one vendor specific device command over a network to a corresponding at least one vendor specific switch device after translation of the generic zone control command.

13. A method as in claim 12, wherein the management application receives the generic zone control command and, in response, generates i) a corresponding first vendor specific command for transmission to a first vendor switch device type, and ii) a corresponding second vendor specific command for transmission to a second vendor switch device type.

14. A method as in claim 13, wherein both the first vendor specific command and the second vendor specific command pertain to a common zoning function supported by a first switch device and a second switch device to which the first vendor specific command and the second vendor specific command are transmitted.

15. A method as in claim 14 further comprising:
  identifying that there is no need to map the generic zone control command to corresponding at least one vendor specific device commands; and
  utilizing the generic zone control command to carry out zone control operations.

16. The method of claim 1 further comprising:
  at a remote node over a network, generating i) a corresponding first vendor specific command, based on the generic zone control command, for transmission to a first switch device type, and ii) a corresponding second vendor specific command, based on the generic zone control command, for transmission to a second switch device type; and
  from the remote node, transmitting i) the corresponding first vendor specific command to a switch device of the first switch device type, and ii) transmitting the corresponding second vendor specific command for transmission to a switch device of the second switch device type, to control zoning associated with hosts and corresponding data storage resources in the storage network.

17. A method as in claim 1, wherein receiving the generic zone control command includes receiving a configuration command to configure the zone in the device to support access in a storage area network.

18. A method as in claim 1, wherein the device is a storage network switch; and
  wherein steps of receiving, translating, and performing are executed in a network manager device that configures the zone associated with the device, the zone indicating which of multiple servers coupled to the device is capable of accessing selected portions of the data storage system.

19. A method as in claim 1 further comprising:
  identifying to which type of vendor device in a storage area network the generic zone control command pertains;
  if the generic zone control command pertains to a first vendor type of device, forwarding the generic zone control command to the first vendor type of device; and
  if the generic zone control command pertains to a second vendor type of device, translating the generic zone control command to a vendor specific zone control command associated with the second vendor type of switch and forwarding the vendor specific zone control command to the second vendor type of device.

20. A method as in claim 1 further comprising:
  executing steps of receiving, translating and performing in a management application operating in a management station computer system at a remote location with respect to the device to which the generic zone control command pertains, the device residing in a storage area network managed by the management application, the management application controlling a zoning configuration in the device by transmitting the at least one vendor specific device command over a network to the device after translation of the generic zone control command into the at least one vendor specific command.

21. A method as in claim 20, wherein the management application receives the generic zone control command and, in response, generates and transmits i) a corresponding first vendor specific command for transmission to a first vendor device type in the storage area network based on translation of the generic zone control command, and ii) a corresponding second vendor specific command for transmission to a second vendor device type in the storage area network based on translation of the generic zone control command, both the first device type and the second device type implementing access control according to zone configuration settings as initiated by the generic zone control command.

22. A method as in claim 21, wherein both the first vendor specific command and the second vendor specific command pertain to a common zoning function supported by the first device type and the second device type to which the first vendor specific command and the second vendor specific command are respectively transmitted, the common zoning function providing access control for servers attempting to retrieve data from respective storage systems over a storage area network in which the first device type and the second device type reside.

23. A method as in claim 1, wherein translating the generic zone control command includes:
in response to receipt of the generic zone control command at a management station of a storage area network that configures zoning in the storage area network at a remote location with respect to the plurality of different vendor devices that reside in the storage area network, identifying multiple zone management devices in the storage area network to which the generic zone control command pertains, the zone management devices being of at least two different vendor types, each of which understands a different set of zone configuration commands, the zone management devices enabling a host to retrieve data from a storage system in the storage area network;
identifying vendor types associated with the multiple zone management devices;
in response to identifying the vendor types associated with the multiple zone management devices, selecting respective sets of vendor specific device commands understood by respective vendor types of the zone management devices to which the generic zone control command pertains;
for each of the at least two different vendor types of zone management devices:
based on the respective sets of vendor specific device commands, determining whether the generic zone control command needs to be translated to a corresponding zone configuration command understood by a respective vendor type of zone management device or whether the respective vendor type of device can interpret the generic zone configuration command and needs no translation;
if translation is required, mapping parameters of the generic zone control command to parameters of a respective vendor specific device command to be forwarded to the respective vendor type of zone management device for configuring its corresponding zone settings;
if no translation is required, initiating transmission of the generic zone control command to the respective vendor type of zone management device in order to configure corresponding zone settings of the respective vendor type of zone management device.

24. A computer system configured to control zoning in a plurality of devices from different vendors in a network, the computer system comprising:
an input-output interface;
a processor; and
a memory system coupled to the processor and to the input-output interface and
encoded with instructions that form a multi-zone management application that, when performed on the processor, cause the computer system to:
receive, via the input-output interface, a generic zone control command;
translate the generic zone control command to at least one vendor specific device command of a plurality of vendor specific device commands that respectively control zoning in a plurality of different vendor devices coupled to the input-output interface; and
perform the at least one vendor device specific command to control zoning in a device coupled to the input-output interface;
wherein the instructions that control zoning within the device, and when performed on the processor, cause the computer system to control which of multiple ports in the device shall be grouped together to form a zone through which servers are able to access a data storage system in a storage area network; and
wherein the instructions that control which of multiple ports in the device shall be grouped together to form the zone, when performed on the processor, cause the computer system to configure multiple server ports and multiple data storage ports of the device to be in the zone, the multiple server ports associated with the zone handling a transfer of data between a server and the device, the multiple data storage ports associated with the zone handling a transfer of data between the device and the data storage system.

25. The computer system of claim 24 further including:
a multi-zone command database containing the plurality of vendor specific device commands; and
wherein the multi-zone management application encoded within the memory system includes instructions that, when performed on the processor, cause the computer system to:
identify a vendor of at least one device within the zone corresponding to the generic zone control command;
select a set of vendor specific device commands, from the plurality of vendor specific device commands in the multi-zone command database, that corresponds to the vendor of at least one device within the zone; and
map the generic zone control command to at least one vendor specific device command within the set of vendor specific device commands.

26. The computer system of claim 25 wherein the instructions that select, when performed on the processor, cause the computer system to select the set of vendor specific device commands that are specific to a vendor of a device within the zone to which the generic zone control command is directed.

27. The computer system of claim 25 wherein the instructions that identify, when performed on the processor, cause of the computer system to:
identify devices within the zone that are affected by the generic zone control command; and
identify vendors of the devices within the zone that are affected by the generic zone control command.

28. The computer system of claim 24 wherein:
the plurality of vendor specific device commands within the multi-zone command database include sets of vendor specific device commands; and
wherein the instructions that translate, when performed on the processor, cause the computer system to:
select a set of vendor specific device commands that can control zoning within the device to which the generic zone control command is directed; and
dynamically load the set of vendor specific device commands into the memory system to allow the management application to control zoning within the device to which the generic zone control command is directed.

29. The computer system of claim 28, wherein the instructions that translate, when performed on the processor, cause the computer system to:
select the at least one vendor specific device command, within the set of vendor specific device commands, that performs zoning operations, in the device to which the generic zone control command is directed, in accordance with the generic zone control command; and map parameters of the generic zone control command to parameters of the at least one vendor specific device command to provide the vendor specific device command with data required to perform the zoning operations in the device.

30. The computer system of claim 28 wherein the instructions that select the set of vendor specific device commands, when executed, cause the computer system to select the set of the vendor specific device commands based on an identity of a vendor of the device to which the generic zone control command is directed.

31. The computer system of claim 24 wherein the multi-zone management application is a device management application that can control zoning in a network of switches from different vendors, the network coupled to the input-output interface.

32. The computer system of claim 24 wherein the instructions that perform, when performed on the processor, cause the computer system to perform the at least one vendor specific device command to control zoning within the device from a vendor that is a vendor of devices that are controlled by the vendor specific device command to which the generic zone control command is mapped.

33. The computer system of claim 24 wherein the instructions that translate, when performed on the processor, cause the computer system to load a library of vendor specific device commands into a management application based on a vendor of a device affected by the generic zone control command to allow the management application to perform vendor specific device commands in order to carry out the generic zone control command within the device affected by the generic zone control command.

34. The computer system of claim 24 wherein the instructions that translate, when performed on the processor, cause the computer system to load a dynamically linked library of vendor specific device commands, selected by a device identifier coupled to the memory system, based on a vendor of a device affected by the zoning control command, into the memory system for use by the management application to control zoning in the device.

35. The computer system of claim 24 wherein the memory system is encoded with at least one command mapping that indicates how the generic zone control command corresponds to the vendor specific device command for a specific vendor device, and wherein the instructions that translate use the command mapping to map the generic zone control command to a format required by the vendor device specific command within the vendor device specific command set.

36. A computer system as in claim 24, wherein the instructions that receive the generic zone command, when performed on the processor, cause the computer system to receive a configuration command to configure the zone in the device to support access to a storage area network.

37. A computer system as in claim 36, wherein the device is a storage network switch; and
wherein the instructions that receive, translate, and perform are executed in a network manager device that configures the zone associated with the device, the zone indicating which of multiple servers coupled to the device is capable of accessing selected portions of the data storage system.

38. A computer system as in claim 24 further including instructions to support operations of:
identifying to which type of vendor device in a storage area network the generic zone control command pertains;
if the generic zone control command pertains to a first vendor type of device, forwarding the generic zone control command to the first vendor type of device; and
if the generic zone control command pertains to a second vendor type of device, translating the generic zone control command to a vendor specific zone control command associated with the second vendor type of switch and forwarding the vendor specific zone control command to the second vendor type of device.

39. A computer program product having a computer-readable medium including computer program logic encoded thereon that when performed on a computer system provides a method for controlling zoning within a device, and wherein when the computer program logic is performed on a processor in the computer system, the computer program logic causes the processor to perform the operations of:
receiving a generic zone control command;
translating the generic zone control command to at least one vendor specific device command of a plurality of vendor specific device commands that respectively control zoning in a plurality of different vendor devices; and
performing the at least one vendor specific device command to control which of multiple ports in the device are grouped together to form a zone through which servers are able to access a data storage system in a storage area network; and
configuring multiple server ports and multiple data storage ports of the device to be in the zone, the multiple server ports associated with the zone handling a transfer of data between a server and the device, the multiple data storage ports associated with the zone handling a transfer of data between the device and the data storage system.

40. The computer program product of claim 39 wherein the plurality of vendor specific device commands includes sets of vendor specific device commands and wherein the computer program logic that causes the processor to perform the operation of translating, when performed on the processor, causes the processor to perform a operations of:
selecting a set of vendor specific device commands that can control zoning within the device to which the generic zone control command is directed; and
dynamically loading the set of vendor specific device commands into a management application to allow the management application to control zoning within the device to which the generic zone control command is directed.

41. The computer program product of claim 39 wherein the computer program logic that, when performed on the processor, causes the processor to perform the operation of translating, further includes instructions that, when performed on the processor, cause the processor to perform the operations of:
selecting the at least one vendor specific device command, within the set of vendor specific device commands, that performs zoning operations, in the device to which the generic zone control command is directed, in accordance with the generic zone control command; and mapping parameters of the generic zone control command to parameters of the at least one vendor specific device command to provide the vendor specific device command with data required to perform zoning operations in the device.

42. A management application that operates to control zoning in devices from different vendors in a data storage network, the management application comprising:
   a management application user interface that receives a generic zone control command;
   a multi-vendor application programming interface coupled to the multi-zone management application user interface, the multi-vendor application programming interface obtaining from a multi-zone command database, based on the generic zone control command, a vendor specific command set containing functions that control zoning in a device associated with the generic zone control command;
   a command mapping accessible by the multi-vendor application programming interface, the command mapping defining mappings between parameters from the generic zone control command to parameters required by the vendor specific commands within the vendor specific command set;
   the multi-vendor application programming interface using the command mapping to map the generic zone control command to at least one vendor specific command and performing the at least one vendor specific command to control zoning within a specific vendor device associated with the generic zone control command;
   wherein the management application controls which of multiple ports in the device shall be grouped together to form a zone through which servers are able to access a data storage system in a storage area network; and
   wherein the management application configures multiple server ports and multiple data storage ports of the device to be in the zone, the multiple server ports associated with the zone handling a transfer of data between a server and the device, the multiple data storage ports associated with the zone handling a transfer of data between the device and the data storage system.

43. In a network management application operating in a management station computer system controlling zoning of different vendor types of data switches in a network, a method comprising:
   receiving a generic zone control command;
   identifying at least two different vendor specific types of switch devices to which the generic zone control command pertains;
   translating the generic zone control command into corresponding vendor specific device commands for the at least two different vendor specific types of switch devices;
   transmitting the vendor specific device commands over the network to the at least two different vendor specific types of switch devices;
   wherein the receiving, identifying, translating and transmitting are executed by a management application that controls zoning within the at least two different vendor specific types of switch devices;
   wherein the management application controls which of multiple ports in the at least two different vendor specific types of switch devices shall be grouped together to form a zone through which servers are able to access a data storage system in a storage area network; and
   wherein the management application configures multiple server ports and multiple data storage ports of the switch devices to be in the zone, the multiple server ports associated with the zone handling a transfer of data between a server and the switch devices, the multiple data storage ports associated with the zone handling a transfer of data between the switch devices and the data storage system.

44. A method as in claim 43 further comprising:
   identifying that there is no need to map the generic zone control command into different vendor specific device commands; and
   utilizing the generic zone control command to carry out zone control operations.

* * * * *